3,173,761
USE OF GIRARD T REAGENT IN QUANTITATIVE ALIPHATIC n-ALDEHYDE DETERMINATIONS
Adam M. Gaddis, Upper Marlboro, Md., and Rex Ellis, Washington, D.C., assignors to the United States of America as represented by the Secretary of Agriculture
No Drawing. Filed Mar. 12, 1962, Ser. No. 179,257
17 Claims. (Cl. 23—230)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes is hereby granted to the Government of the United States of America.

This invention relates to the isolation and determination of semimicro to micro quantities of carbonyl compounds.

We have recently developed procedures for the separation and estimation of small quantities of the 2,4-dinitrophenylhydrazone derivatives of several classes of aliphatic n-aldehydes. In order to apply these procedures to the determination of aldehydes in complex mixtures, as may occur in natural sources or as the result of chemical reaction, it is necessary to separate the carbonyl compounds from the non-carbonyl compounds. A potentially effective method for isolation of carbonyl compounds from mixtures soluble in non-polar solvents is to react the carbonyl compounds with Girard T reagent (N,N,N-trimethyl ammonium acetylhydrazine chloride) to form water-soluble hydrazones.

Attempts to apply a typical procedure for the Girard T reaction in the separation and determination of n-aldehydes gave high, inaccurate, and erratic data. A study of the reaction showed that errors were introduced by high blanks. The greater part of the blank was found to result from a curious reaction between the primary alcohols used as solvents and both the Girard T reagent and 2,4-dinitrophenylhydrazine. Methanol and ethanol have been the standard solvents used in the Girard T reaction since it was first reported. Apparently formaldehyde or acetaldehyde, respectively, are formed under the conditions by a dehydrogenation reaction, and the corresponding hydrazones are produced.

The results indicated that primary alcohols could not be used as a solvent for an analytical procedure based on the Girard T reaction. We have discovered, however, that tertiary butyl alcohol is a substantially inert solvent for use in the presence of the Girard T reagent and 2,4-dinitrophenylhydrazine and has satisfactory solubility properties for the reactants.

In general, according to the present invention, an analysis of a monocarbonyl compound, especially the aliphatic monocarbonyls such as saturated aldehydes, unsaturated aldehydes and alkanones, is obtained by a process comprising contacting the monocarbonyl compound in solution in tertiary butyl alcohol with trimethyl ammonium acetylhydrazine chloride until the monocarbonyl compound has reacted essentially quantitatively to produce a water-soluble hydrazone, separating the hydrazone from the reaction mixture, reacting the hydrazone with 2,4-dinitrophenylhydrazine in the presence of dilute aqueous hydrochloric acid to produce the corresponding 2,4-dinitrophenylhydrazone, separating the 2,4-dinitrophenylhydrazone and quantitatively determining the amount of monocarbonyl compound.

In a typical procedure for the determination of about 0.05 to 0.5 mg. of a monocarbonyl, the sample containing the monocarbonyl was combined with 20 ml. tertiary butyl alcohol containing 0.5–1.0 g. of Girard T reagent, and the mixture shaken three hours at room temperature. The reaction mixture was poured into 200 ml. of ice water and extracted with petroleum ether to remove all fat-soluble material. The Girard T hydrazones remain in the aqueous phase.

The aqueous phase was combined with 190 ml. of distilled water and 30 ml. of a saturated 2,4-dinitrophenylhydrazine solution in 2 N aqueous hydrochloric acid. After standing overnight at room temperature to convert the Girard T hydrazones to 2,4-dinitrophenylhydrazones the latter were extracted with carbon tetrachloride and separated by passage of extract residues through a small column of hydrated alumina. The eluate containing the monocarbonyl hydrazone was evaporated to dryness, made up to 100 ml. with carbon tetrachloride, an absorbance reading made at the wave length of maximum absorption, and amount of carbonyl was determined. In case of mixtures, paper chromatographic methods were used to identify and separate the monocarbonyl hydrazones prior to preparing the carbon tetrachloride solutions for absorbance readings.

While, as typically practiced, it is most convenient to suspend the trimethyl ammonium acetylhydrazine chloride in tertiary butyl alcohol and combine this solution with the mixture containing the carbonyl compounds, which may or may not be dissolved in tertiary butyl alcohol, the particular means of combining the reactants in solution in this alcohol is immaterial to the invention.

The Girard T reaction proceeds essentially quantitatively for alkanals, alk-2-enals, alk-2,4-dienals, and lower molecular weight 2-alkanones with shaking at room temperature (20–30° C.) in less than three hours.

Various procedures may be employed for separating the water-soluble Girard T hydrazone from the reaction mixture. A convenient method is to combine the reaction mixture with water, preferably cold water, and to extract material inert to the carbonyl reagent with a non-polar solvent such as petroleum ether. There is no need to remove the hydrazones from water as the Girard T hydrazones can be converted directly to 2,4-dinitrophenylhydrazones by reacting with 2,4-dinitrophenylhydrazine under acidic conditions at room temperature. The explanation for the result is that the Girard T hydrazones are hydrolyzed by the acidic conditions which at the same time catalyze formation of 2,4-dinitrophenylhydrazones. Regardless of the reason, an essentially quantitative interchange to the 2,4-dinitrophenylhydrazones is obtained by shaking the reaction mixture with a small amount of carbon tetrachloride for several hours at room temperature. The carbon tetrachloride extracts the 2,4-dinitrophenylhydrazones as formed and helps to drive the reaction to completion. This is not necessary for quantitative reaction of n-aldehydes but is essential for complete reaction of lower molecular weight 2-alkanones.

The 2,4-dinitrophenylhydrazones are separated from the reaction mixture by extraction with carbon tetrachloride. The monocarbonyl hydrazones are purified and freed of dicarbonyl derivatives by chromatography on hydrated alumina and elution with benzene-hexane or benzene.

Quantitative determination of the amount of aldehyde is made by obtaining absorption data and calculating amount from the extinction coefficient. In the case of mixtures, the hydrazones are resolved by paper chromatography into 2-alkanone, n-alkanal, n-alk-2-enal, and n-alk-2,4-dienal classes and the classes separated by paper chromatography into individual compounds, the amounts of which can be determined spectrophotometrically.

SOLVENTS AND REAGENTS

All solvents were rendered carbonyl-free by treatment with acidic 2,4-dinitrophenylhydrazine and distillation. The Girard T reagent was recrystallized several times from ethanol and stored in a desiccator.

A saturated 2,4-dinitrophenylhydrazine solution was made up fresh before use in 2 N aqueous hydrochloric acid and purified by extracting three times with carbon tetrachloride.

Examples 1 to 6 are presented to illustrate absorbance (optical density) readings obtained in blank runs of part or all of the typical procedure, that is, with no aldehyde material being added, contrasting results with ethanol and tertiary butyl alcohol.

Example 1

A mixture of 20 ml. ethanol and 200 ml. distilled water was extracted five times with 15 ml. portions of petroleum ether to simulate removal of non-polar materials as in a typical assay procedure. The extracted aqueous ethanol solution, 30 ml. of saturated 2,4-dinitrophenylhydrazine reagent and 190 ml. of distilled water were combined and allowed to stand one hour at room temperature (about 28° C.). The aqueous solution was extracted five times with 20 ml. portions of carbon tetrachloride. The extracts were combined, dried over anhydrous sodium sulfate, concentrated to a small volume (about 1 ml.), transferred quantitatively to a column of 20% hydrated alumina and the column eluted with 50 ml. benzene. The benzene eluate (an excess of that volume required to elute adsorbed aldehyde hydrazones when present) was evaporated to dryness, the residue dissolved in 100 ml. carbon tetrachloride and absorbance (optical density) reading taken in a 1 cm. quart cell at λ max., 346 mμ. This result and those of Examples 2 to 4 are presented in Table I.

TABLE I.—EFFECT OF SOLVENT AND REACTION METHOD ON BLANKS

| Examples | Girard T reagent | 2,4-Dinitrophenylhydrazine saturated solution (30 ml.) | Ethanol (20 ml.) | Tertiary butyl alcohol (20 ml.) |
| --- | --- | --- | --- | --- |
| 1 | | Room temp., 1 hr | 0.048 | |
| 2 | | Room temp., 24 hr | 0.130 | 0.024 |
| 3 | 0.5 g., Room temp., 3 hr | do | 0.338 | 0.050 |
| 4 | 0.5 g., Refluxed, 1 hr | do | 0.478 | 0.120 |

Example 2

In this example two procedures were conducted concomitantly, one with ethanol and one with tertiary butyl alcohol, following the general plan of Example 1 with the exception that the mixture containing alcohol and 2,4-dinitrophenylhydrazine was allowed to stand 24 hours at room temperature. The optical density reading for the blank of the procedure performed with tertiary butyl alcohol, 0.024, was only a fraction of the 0.130 reading of the procedure performed with ethanol. Moreover, it was evident from the relatively flat absorbance curve of the former (maximum at 320–330 mμ) that essentially all of the absorbance was due to breakdown of 2,4-dinitrophenylhydrazine and not attributable to presence of the tertiary-butyl alcohol; whereas in the latter, the maximum absorbance peak at 346 mμ indicated formation of acetaldehyde from the ethanol.

Example 3

In another set of procedures contrasting tertiary butyl alcohol with ethanol as a solvent for the reagent, 0.5 gram Girard T reagent was shaken with 20 ml. of alcohol for three hours at room temperature. After adding 200 ml. of ice water the procedures were completed as in Example 2. The disparity between the blank readings was more pronounced than in Example 2.

Example 4

A sample of oxidized fat was divided into two equal parts. One part was steam distilled and the distillate received directly into a solution of the 2,4-dinitrophenylhydrazine reagent and reacted and worked up according to typical procedures.

TABLE II—COMPARISON OF TWO METHODS OF ISOLATING ALDEHYDES FROM OXIDIZED FAT

| | Girard T | 2,4-DNPH[1] | Total Absorbance | | Percent Absorbance | | |
| --- | --- | --- | --- | --- | --- | --- | --- |
| | | | Tert. BuOH | No solvent | Alkanal, Percent | 2-Enal, Percent | 2,4-Dienal, Percent |
| Steam distillate of oxidized O₂ fat | | RT, 24 hr.[2] | | 3.10 | 42.3 | 29.1 | 28.6 |
| Direct reaction on oxidized O₂ fat | RT, 3 hr | RT, 24 hr | 2.85 | | 43.5 | 29.7 | 26.8 |

[1] 2,4-Dinitrophenylhydrazine.
[2] Room temperature.

The other part of the oxidized fat was dissolved in 20 ml. tertiary butyl alcohol, reacted with Girard T reagent at room temperature for three hours, diluted with 200 ml. ice water, and the unreacted fat extracted with petroleum ether. The extracted aqueous portion containing Girard T hydrazones was then combined with 30 ml. of 2,4-dinitrophenylhydrazine reagent and 190 ml. water as in the typical procedure, and a mixture of aldehyde 2,4-dinitrophenylhydrazones separated. In each instance the 2,4-dinitrophenylhydrazones were resolved by means of paper chromatography into alkanal, alk-2-enal, and alk-2,4-dienal components. The spots were recovered in carbon tetrachloride, absorbence determined as previously described, and results summarized in Table II.

Total amounts of aldehydes are similar, and there is good agreement in the class composition of the mixture. Hence, the conclusion that the procedure in which Girard T reagent in tertiary butyl alcohol is used to separate aldehydes from oxidized fat gives as accurate an analysis as the volatilization procedure previously used.

Examples 5 to 18

As summarized in Table III, amounts of n-aldehydes

TABLE III.—DETERMINATION OF n-ALDEHYDES

| Example No. | Aldehyde | | Girard T Reaction | Yield, Percent |
|---|---|---|---|---|
| | Class | Amount, mg. | | |
| 5 | $C_{12}$ Alkanal | 0.25 | RT,[1] 3 hr | 103.5 |
| 6 | do | 0.25 | Reflux, 1 hr | 101.9 |
| 7 | do | 0.05 | RT, 3 hr | 84.5 |
| 8 | $C_7$ Alkanal | 0.24 | RT, 3 hr | 93.2 |
| 9 | do | 0.24 | Reflux, 1 hr | 98.7 |
| 10 | $C_4$ Alkanal | 0.24 | RT, 3 hr | 101.1 |
| 11 | $C_3$ Alkanal | 0.24 | RT, 3 hr | 102.6 |
| 12 | do | 0.03 | RT, 3 hr | 96.6 |
| 13 | $C_4$ Alk-2-enal | 2.58 | RT, 3 hr | 102.2 |
| 14 | do | 2.58 | Reflux, 1 hr | 70.8 |
| 15 | do | 0.05 | RT, 3 hr | 107.1 |
| 16 | $C_7$ Alk-2-enal diacetal | 1.96 | RT, 3 hr | 94.3 |
| 17 | $C_9$ Alk-2,4-dienal | 0.28 | RT, 3 hr | 95.1 |
| 18 | do | 0.28 | Reflux, 1 hr | 80.7 |

[1] Room temperature.

ranging from 0.03 mg. to 2.58 mg. were converted to Girard T hydrazones in tertiary butyl alcohol according to the procedure described in Example 3. Since aldehydes are difficult to purify, and to correct for measuring errors, controls were run, omitting the step of making the Girard T hydrazones. The yields in Table III are based on values obtained for the controls. The excellent results show that the procedure conducted under mild conditions (room temperature for three hours) may be used for quantitative determinations. Example 16 indicates that the Girard T reagent is capable of hydrolyzing a diethyl acetal. Refluxing during the Girard T reaction resulted in decreased yields of unsaturated n-aldehydes (Examples 14 and 18).

Acetic acid, a specified component of the original reaction mixture for preparing Girard T hydrazones, may be included in the present reaction mixture, but is not necessary for quantitative reaction of the normal aldehydes, as shown by the foregoing examples. However, in applying the procedure to other monocarbonyls such as the 2-alkanones $$CH_3-\overset{O}{\underset{\|}{C}}-R$$

where R is an alkyl radical, the presence of acetic acid to catalyze the reaction is necessary for quantitative determination of all except the dimethyl ketone and perhaps the 2-alkanones with a carbon chain length of four or five carbon atoms.

Examples 19–24

Triplicate weighings of each alkanone were made and processed as indicated in Table IV. The controls were converted directly to 2,4-nitrophenylhydrazones. One sample was reacted with Girard T in 20 ml. tertiary butyl alcohol, the third sample reacted with Girard T in 20 ml. tertiary butyl alcohol with 2 ml. glacial acetic acid added. In the latter procedure the water with which the reaction mixture was combined contained sodium carbonate in an amount calculated to be the acid equivalent of the acetic acid. In other respects the procedures were performed as previously described.

The results show that the new procedure in the presence of acetic acid is applicable to quantitative determination of 2-alkanones up to a carbon chain length of at least eleven, probably thirteen.

The use of the present process, as illustrated in the foregoing examples may be applied to the determination of monocarbonyl compounds such as n-alkanals, n-alk-2-enals, and n-alk-2,4-dienals, and lower molecular weight 2-alkanones. Since the process can be conducted under mild conditions which do not split or disturb hydroperoxides, it is expected that it will be important in the determination of free monocarbonyl compounds resulting from reactions which also produce hydroperoxides.

We claim:

1. A method for the quantitative determination of monocarbonyls comprising contacting a monocarbonyl compound in solution in tertiary butyl alcohol with trimethyl ammonium acetylhydrazine chloride until the monocarbonyl has reacted essentially quantitatively with the trimethyl ammonium acetylhydrazine chloride to produce a hydrazone, separating said hydrazone from the reaction mixture, contacting said hydrazone with sufficient 2,4-dinitrophenylhydrazine in the presence of dilute aqueous hydrochloric acid to displace trimethyl ammonium acetylhydrazine and produce the corresponding 2,4-dinitrophenylhydrazone, separating the 2,4-dinitrophenylhydrazone, and quantitatively determining the amount of monocarbonyl compound.

2. The method of claim 1 in which the monocarbonyl compound is selected from the group consisting of normal saturated aldehydes, normal unsaturated aldehydes, and lower molecular weight 2-alkanones.

3. The method of claim 2 in which the monocarbonyl compound is a normal saturated aldehyde.

4. The method of claim 3 in which the normal aldehyde is propionaldehyde.

5. The method of claim 3 in which the normal aldehyde is butyraldehyde.

6. The method of claim 3 in which the normal aldehyde is $CH_3(CH_2)_5CHO$.

7. The method of claim 3 in which the normal aldehyde is $CH_3(CH_2)_{10}CHO$.

TABLE IV.—DETERMINATION OF METHYL KETONES

| Example No. | Class | Ketone, mg. | Theoretical absorbance | Girard T reaction | 2,4-DNPH[1] | Absorbance found | Yield | |
|---|---|---|---|---|---|---|---|---|
| | | | | | | | Based on control, percent | Based on theory, percent |
| 19 | $C_3$ 2-Alkanone | 0.235 | 0.830 | ------ | RT[2] | 0.778 | 100.0 | 93.7 |
| | | | | RT, 3 hr | RT | 0.779 | 100.1 | 93.9 |
| | | | | AcOH RT, 3 hr | RT | 0.770 | 98.9 | 92.8 |
| 20 | $C_5$ 2-Alkanone | 0.241 | 0.573 | ------ | RT | 0.622 | 100.0 | 108.6 |
| | | | | RT, 3 hr | RT | 0.515 | 82.8 | 89.9 |
| | | | | AcOH RT, 3 hr | RT | 0.610 | 98.1 | 106.5 |
| 21 | $C_7$ 2-Alkanone | 0.285 | 0.515 | ------ | RT | 0.546 | 100.0 | 106.0 |
| | | | | RT, 3 hr | RT | 0.352 | 64.5 | 68.5 |
| | | | | AcOH RT, 3 hr | RT | 0.518 | 94.9 | 100.6 |
| 22 | $C_9$ 2-Alkanone | X | X | ------ | RT | 3.407 | 100.0 | |
| | | | | RT, 3 hr | RT | 2.170 | 63.7 | |
| | | | | AcOH RT, 3 hr | RT | 3.200 | 93.9 | |
| 23 | $C_{11}$ 2-Alkanone | X | X | ------ | RT | 3.161 | 100.0 | |
| | | | | RT, 3 hr | RT | 1.460 | 46.2 | |
| | | | | AcOH RT, 3 hr | RT | 3.020 | 95.5 | |
| 24 | $C_{13}$ 2-Alkanone | 0.248 | 0.250 | ------ | RT | 0.269 | 100.0 | 105.5 |
| | | | | RT, 3 hr | RT | 0.207 | 76.9 | 81.2 |
| | | | | AcOH RT, 3 hr | RT | 0.245 | 91.1 | 96.1 |

[1] 2,4-Dinitrophenylhydrazine.
[2] Room temperature, 24 hr.
X = Sample impure, but same weight used in each procedure.

8. The method of claim 2 in which the monocarbonyl compound is a normal unsaturated aldehyde.

9. The process of claim 8 in which the normal unsaturated aldehyde is $CH_3-CH=CH-CHO$.

10. The process of claim 8 in which the normal unsaturated aldehyde is $CH_3-(CH_2)_3-CH=CH-CHO$.

11. The process of claim 8 in which the normal unsaturated aldehyde is $$CH_3-(CH_2)_3-CH=CH-CH=CH-CHO$$

12. The method of claim 2 in which the monocarbonyl compound is a lower molecular weight 2-alkanone.

13. The method of claim 12 in which the 2-alkanone is $CH_3-CO-CH_3$.

14. The method of claim 12 in which the 2-alkanone is $CH_3-CO-(CH_2)_2-CH_3$.

15. The method of claim 12 in which the 2-alkanone is $CH_3-CO-(CH_2)_4-CH_3$.

16. The method of claim 12 in which the 2-alkanone is $CH_3-CO-(CH_2)_6-CH_3$.

17. The method of claim 12 in which the 2-alkanone is $CH_3-CO-(CH_2)_8-CH_3$.

References Cited by the Examiner

Toren et al.: "Anal. Chem.," 27, 1986–88 (1955).
Peyron: "Anal. Abstracts," 8, 1596 (1961).
Stanley et al.: "J. of Food Science," 26, 43–48 (1961).

MORRIS O. WOLK, *Primary Examiner.*

DELBERT E. GANTZ, *Examiner.*